(12) United States Patent
Sigler et al.

(10) Patent No.: US 7,009,764 B1
(45) Date of Patent: Mar. 7, 2006

(54) MULTI-APERTURE HIGH FILL FACTOR TELESCOPE

(75) Inventors: Robert Dayton Sigler, Cupertino, CA (US); Alan Lee Ducan, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 68 days.

(21) Appl. No.: 10/206,087

(22) Filed: Jul. 29, 2002

(51) Int. Cl.
*G02B 23/24* (2006.01)

(52) U.S. Cl. ...................... 359/434; 359/399
(58) Field of Classification Search ............... 359/399, 359/430, 434, 435, 403, 407, 408, 409, 410, 359/411, 412, 480, 481, 629, 630, 631
See application file for complete search history.

(56) References Cited

U.S. PATENT DOCUMENTS

| | | | | |
|---|---|---|---|---|
| 4,856,884 A | * | 8/1989 | Fender et al. ............... | 359/419 |
| 4,953,964 A | * | 9/1990 | Anafi et al. ................ | 359/419 |
| 5,282,082 A | * | 1/1994 | Espie et al. ................ | 359/353 |
| 5,291,333 A | * | 3/1994 | Mills et al. ................ | 359/601 |
| 5,898,529 A | | 4/1999 | Meyer et al. | |
| 5,905,591 A | | 5/1999 | Duncan et al. | |

OTHER PUBLICATIONS

U.S. Appl. No. 10/803,788, filed Mar. 17, 2004, Sigler et al.
T. W. Stuhlinger, "All-Reflective Phased Array Imaging Telescopes," International Lens Design Conference, G.N. Lawrence, ed., Proc. Soc. Photo-Opt Instrumentation Eng. 1354, pp. 438-446 (1990).

* cited by examiner

Primary Examiner—Drew A. Dunn
Assistant Examiner—Joshua L Pritchett
(74) Attorney, Agent, or Firm—McDermott Will & Emery LLP

(57) ABSTRACT

A space-based multi-aperture telescope is capable of achieving high fill factors, on the order of at least 50% and more preferably at least 80%. High fill factors can be achieved according to the present invention by providing a combiner section that combines the light collected by plural sub-aperture telescopes at the exit pupil of the telescope.

32 Claims, 6 Drawing Sheets

MULTI-APERTURE HIGH FILL FACTOR TELESCOPE

BACKGROUND OF THE INVENTION

1. Field of the Invention

The present invention relates generally to the field of optics, and more specifically, to a multi-aperture telescope with high fill factor. In a spaced-based telescope application of the invention, light from a plurality of collector telescopes is combined by a combiner telescope located at a real exit pupil of the collector telescopes, thus allowing a fill factor for a multiple aperture telescope array to be comparable to a segmented primary telescope.

2. Description of the Related Art

Traditionally a telescope system consists of a large collecting element (usually called the "primary" which may be either a lens or a mirror) located at the entrance pupil and possibly some smaller elements to relay or convey the light to an image plane. A refractive example of this is shown in FIG. 1, which shows a relatively large aperture telescope with relay elements. In particular, the telescope includes a primary lens 10 near the entrance pupil 12, and two smaller relay lenses 14 and 16. In the example of FIG. 1, the light from an intermediate image formed at the intermediate image plane 18 is first collimated and then relayed in such a way that a real exit pupil 20, i.e., an image of the entrance pupil, is formed before the image plane 22.

As telescope systems become larger and larger, in order to achieve higher resolution and to collect more light, a point is eventually reached where the size of the required elements, especially the primary minor, exceeds the current state of the art in fabrication and support. For telescopes larger than this, the entrance pupil must either be divided into manageable segments, so as to provide a "segmented primary" approach, or the entrance pupil is divided into an array of separate telescopes, providing a "multiple telescope" approach.

An example of a multiple telescope array is shown in FIG. 2, which shows the use of refractive elements for simplicity. In reality, most if not all large telescopes use reflective elements. As seen in FIG. 2, a first sub-aperture telescope includes a primary element 24 positioned near an entrance pupil 26, and a secondary element 28. A second sub-aperture telescope similarly includes a primary element 30 and a secondary element 32. The light from the sub-aperture telescopes is recombined coherently with additional optics, such as flat mirrors generally referred to by the numeral 34, to form an image, at the image plane 36, with high resolution. Lens element 38, disposed before the image of the exit pupil, is part of the combiner optics.

Essentially, the structure shown in FIG. 2 provides a sparse array telescope having a plurality of sub-aperture afocal telescopes and a combiner telescope. The manner in which the light from the sub-apertures is recombined is critical for good resolution. U.S. Pat. No. 5,905,591 to Duncan et al. discloses a particularly effective way of doing so for a space-based telescope in which a plurality of sub-aperture telescopes are disposed on deployable booms. The portion of the light falling on the inscribed entrance pupil that is collected by the sub-aperture array is referred to as the "fill factor." With the structure shown in U.S. Pat. No. 5,905,591, the recombining scheme would have a fill factor of much less than 50% (assuming a finite field of view). Low fill factors such as this are associated with designs that are said to be "sparse."

A need exists for an optical system that is capable of achieving fill factors greater than about 50%, thus constituting a "high" fill factor, or a "highly filled" telescope.

Of course, the present invention relates to space-based telescopes, which have problems uniquely associated with devices that must be launched and precisely controlled. Astronomical instruments have been placed in space since the early days of space exploration.

What makes a space-based telescope desirable is the visual clarity that results from being above the Earth's atmosphere. However, location above the atmosphere is only part of the equation, and like any terrestrial telescope, an excellent optical system is required to achieve its resolution potential. The HST includes an optical telescope assembly having a primary mirror and a secondary mirror, arranged in a Ritchey-Chretien Cassegrain configuration, in which the two mirrors form a focused image over the largest possible field of view. In particular, incoming light travels down a tube fitted with baffles that keep out stray light. The light is collected by the concave primary mirror and reflected toward the smaller, convex secondary mirror. The secondary mirror reflects the light back toward a hole in the center of the primary. The light is then focused on a small area called the focal plane, where it is transferred to various instruments.

Because it is difficult to launch and package payloads of large diameter, telescopes having multiple, relatively smaller primary reflectors have been devised. The aforementioned U.S. Pat. No. 5,905,591 to Duncan et al. describes an optical system, which provides a greater diameter by using sub-aperture telescopes that are mounted on a deployable boom. Such arrangements require combining relay optics as noted above.

Others have recognized the problems of launching a large aperture telescope. U.S. Pat. No. 5,898,529 to Meyer et al. describes a space-based telescope in which a primary reflector is segmented to provide two concentric rows of reflector segments, thus rendering the telescope stowable in a disposition more suitable for launching from a cargo bay of limited dimensions. However, this approach is to provide a single telescope rather than an array of telescopes.

SUMMARY OF THE INVENTION

The present invention provides optical systems primarily for space-based operations in which fill factors of greater than about 50% are obtained, or in other words optical systems, such as multi-aperture telescopes, that are highly filled are the essence of the present invention. To achieve a high fill factor, thus differentiating the present invention over sparse multiple telescope array, the disposition of the flat relay mirrors are modified and a unique combiner telescope is provided in a way that light from the multiple telescopes is combined at a unique location: at the exit pupil of the system.

A multiple telescope array, having a radial distribution of sub-apertures, with a high fill factor according to the present invention, recombines light from the sub-apertures at the exit pupil of the array, which is usually located within the combiner telescope. The portion of optical elements (i.e., the clear aperture) of the combiner telescope associated with a given sub-aperture (i.e., the primary, secondary, and tertiary mirror segments) are displaced in a radial direction. This permits the individual elements to be large enough to accommodate a finite field of view without physically interfering with the elements of the adjacent apertures.

The light from the displaced combiner elements noted above are re-directed to the array exit pupil with a pair of fold mirrors arranged in a periscope configuration, so as to facilitate recombining light from the displaced sub-apertures at the system exit pupil of the array, which as noted above, is typically located within the combiner telescope.

With sparse arrays, such as that which is described in U.S. Pat. No. 5,905,591, there is considerable space between adjacent collector telescopes (or sub-apertures). This space significantly lowers the array fill factor but it also permits the beams from the collectors to be directed into the combiner telescope by a series of flat mirrors located near the combiner primary mirror that do not physically interfere with one another. The position of these flat mirrors controls the mapping of the light between the entrance pupil and the exit pupil of the array (there are strict requirements on this mapping to permit the array to generate phased images over an extended field of view). Because the mirrors are not located at a system pupil, they must be substantially larger in size than that dictated by an axial light bundle. In sparse arrays, the size of these fold mirrors (without interfering with the adjacent fold mirrors) is what usually limits the un-vignetted field of view of the array. To achieve a high fill factor, the spaces between the adjacent collector telescopes must be made very small. With the beam combining technique of the present invention it is possible to achieve a resulting un-vignetted field of view that is essentially zero.

The features and advantages of the invention will become more apparent from the following detailed description when taken in conjunction with the illustrative embodiments in the accompanying drawings.

DETAILED DESCRIPTION OF THE PREFERRED EMBODIMENTS

Figure 1:
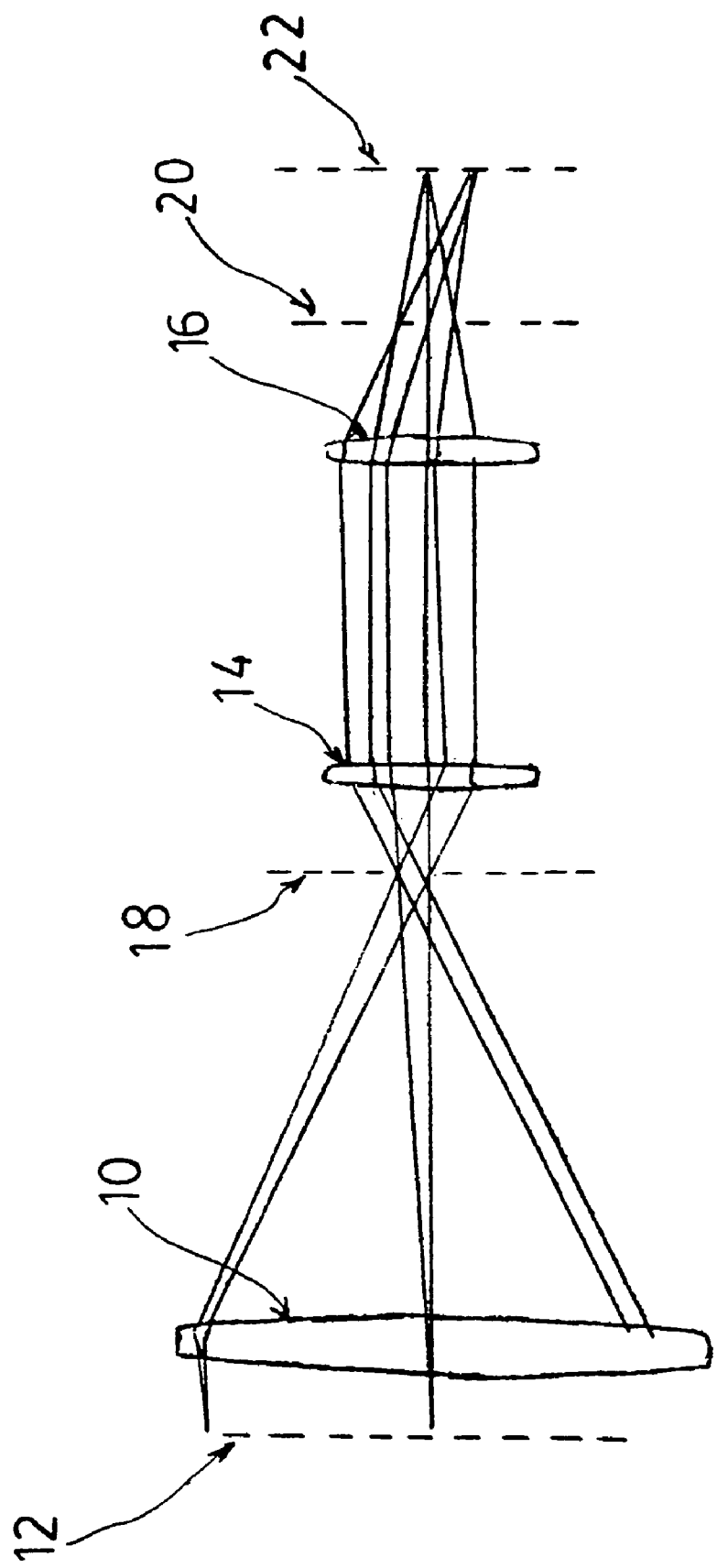
FIG. 1 is a schematic view of a known large aperture telescope, using refractive optics and showing image relay components.
Figure 2:
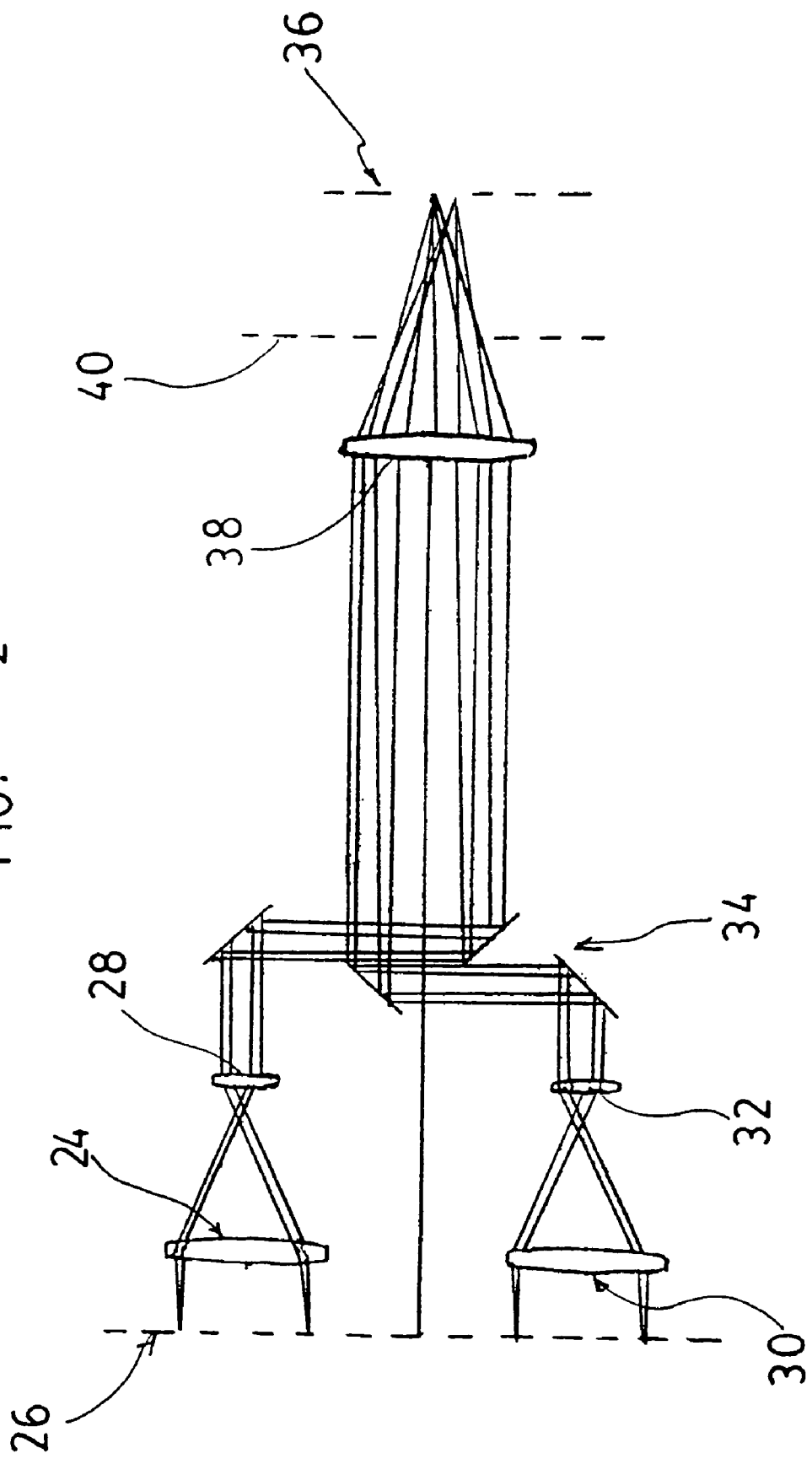
FIG. 2 is a schematic view of a known, sparse array telescope, also using refractive optics, and showing two sub-aperture afocal telescopes and a combiner telescopes.
Figure 3:
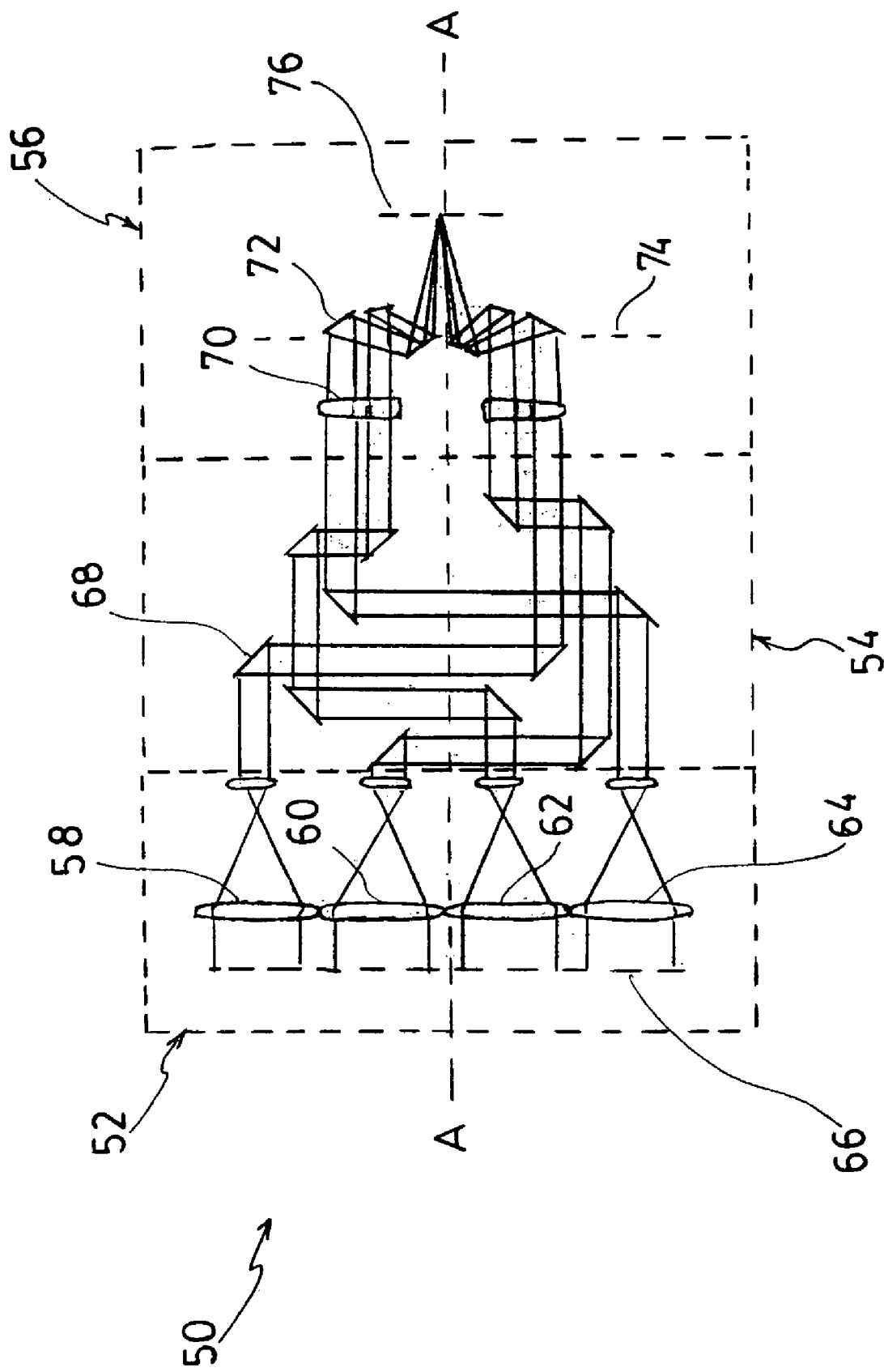
FIG. 3 is a schematic view of a high fill factor telescope array according to the present invention, and including a plurality of sub-aperture afocal telescopes that are combined in the exit pupil of the combiner telescope, and shown using refractive elements in the collector section and the combiner section.

Referring to FIG. 3, a high fill factor telescope array 50 according to the present invention has a collector section 52, a relay section 54, and a combiner section 56. The optical axis of the telescope system is designated by the dashed line "A—A." The collector section of the illustrated embodiment includes four sub-aperture telescopes employing refractive elements. The primary collectors 58, 60, 62 and 64 collectively define an entrance pupil 66 of the telescope. Each collector has a corresponding secondary collector, shown in the optical path of the major rays of the respective primary elements.

The relay section 54 includes a plurality of fold mirrors, such as fold mirror 68, for directing light from the respective sub-aperture telescopes to the combiner section 56. The combiner section includes a primary refractive element 70 and a plurality of fold mirrors 72 which recombine light from the sub-aperture telescopes at the exit pupil 74 and focus the recombined light at the image plane 76.

Although the embodiment of FIG. 3 is shown with refractive elements in the collector section and partially in the combiner section, it is understood that the general principals of the present invention apply to systems employing either refractive or reflective elements.

Figure 4:
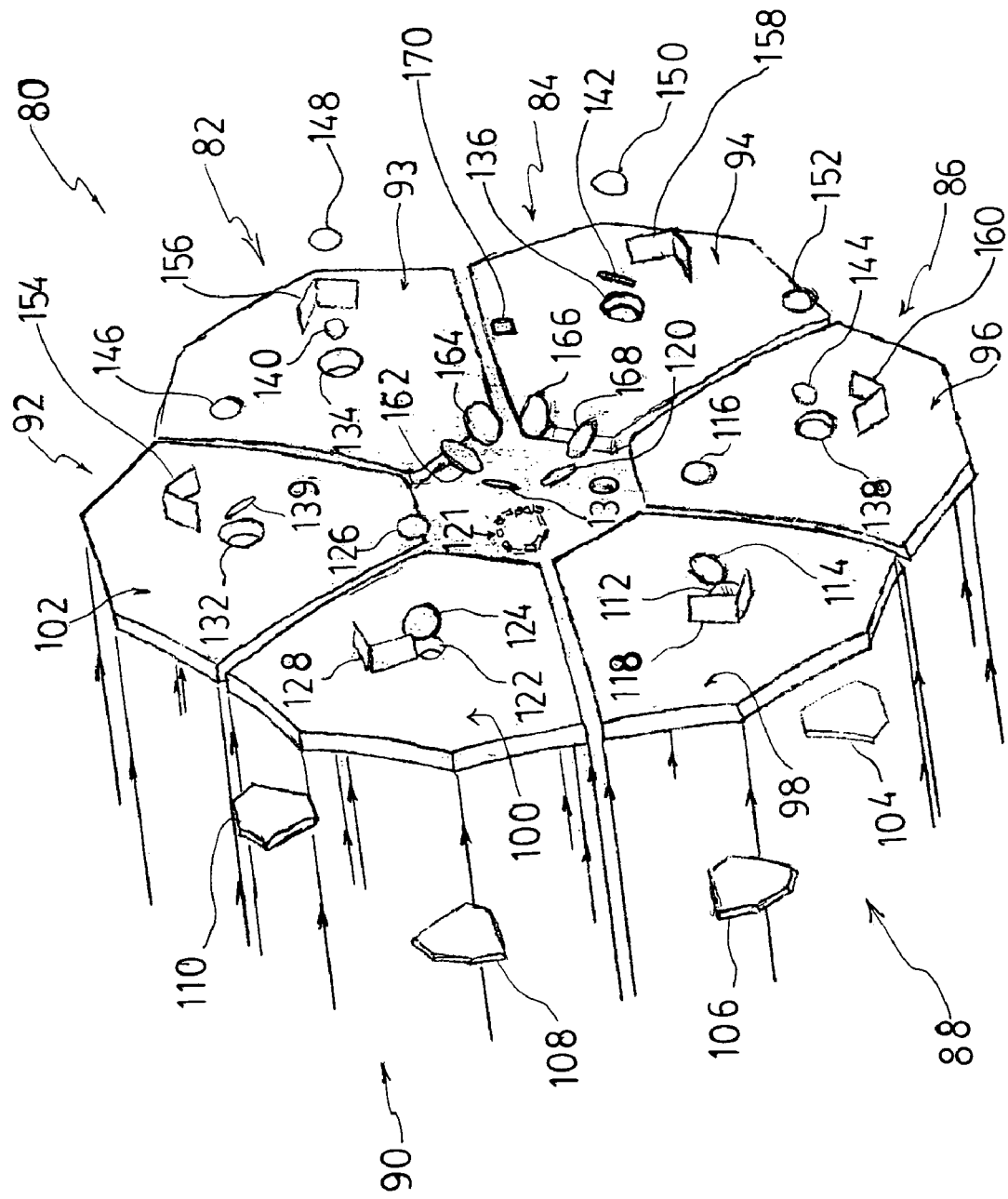
FIG. 4 is a rear perspective view of a high fill factor telescope array using reflective elements according to a preferred embodiment of the present invention.

An embodiment of the present invention using reflective elements is shown in FIG. 4. As seen in FIG. 4, a high fill factor telescope array 80 includes six sub-aperture afocal telescopes 82, 84, 86, 88, 90, and 92. Each sub-aperture telescope includes a primary reflector or element 93, 94, 96, 98, 100, 102, respectively. Each reflector element has a reflective surface that receives light from an object field, as indicated by the light rays (indicated by arrows). The incoming light gathered by each primary element is reflected back to a secondary reflector or element. In the view of FIG. 4, the secondary element 104 of sub-aperture telescope 86 is shown positioned in cooperative relationship with the primary element 96; secondary element 106 of sub-aperture telescope 88 is shown positioned in cooperative relationship with the primary element 98; secondary element 108 of sub-aperture telescope 90 is shown positioned in cooperative relationship with the primary element 100; and secondary element 110 of sub-aperture telescope 92 is shown positioned in cooperative relationship with the primary element 102. The secondary elements of the sub-aperture telescopes, not visible from the perspective view of FIG. 4, but would be similarly shaped and positioned and in cooperative relationship with corresponding primary reflectors 93 and 94.

Each primary reflector has a reflecting surface that faces its corresponding secondary reflector. Each secondary reflector has a concave reflecting surface that directs light back through the primary reflectors to the tertiary mirrors (see FIG. 4 elements 116, 126, 146, 148, 150, and 152) each of which nominally collimates the light and directs it to the subsequent relay and combining optics. Each reflector is sized and shaped to maximize performance while maintaining an ability to be stowed for launch, then deployed in space. In the illustrated embodiment, the primary and secondary reflectors are hexagonally shaped, when deployed the primary reflectors resemble a single, large reflector with a center opening.

In the terminology associated with the embodiment of FIG. 3, the respective primary, secondary, and tertiary reflectors of the sub-aperture telescopes 82, 84, 86, 88, 90 and 92 form the collector section of the telescope array 80.

Mechanical structure for supporting the primary and secondary elements in their stowed and deployed positions are not illustrated to provide clarity of illustration of the optical components. However, it is within the purview of the skilled practitioner to devise appropriate structure, which would depend on the size and shape of the launch system (such as NASA's Shuttle cargo bay) and the desired capabilities and missions expected of the system which incorporates the above-described optics.

The relay optics of the embodiment of FIG. 4 include a plurality of reflector elements disposed on the back-side of the primary elements. For clarity of illustration the ray paths have been deleted from FIG. 4 except for the initial incoming light from the object field. For the sub-aperture telescopes shown in FIG. 4, a description of the optical path will follow.

Light from a remote object strikes the reflective surface of the primary reflector 98 of sub-aperture telescope 88 and is directed to the reflective surface of the secondary reflector 106. The secondary reflector 106 directs light through a hole 112 in the primary reflector 98. The light passes through the hole 112, through a perforated fold flat 114, and strikes a collimating tertiary mirror 116. The tertiary mirror 116 directs the light back to the perforated fold flat 114 which directs the light on to the trombone mirror pair 118, which can be adjusted with adjusting means (not shown) to provide path-length adjustment, image rotation, and other functions as needed to combine the light from the different sub-apertures coherently.

The upper mirror of the mirror pair 118 then directs light to a nominally fixed fold flat 120, which then directs the light through the center of the array to a plurality of combiner elements which constitute the combiner module or section. Due to scale, the combiner section is generally referred to by the numeral 121. The fold flat 120 can be an oversized mirror which can facilitate pupil mapping adjustments.

Each of the other sub-aperture telescopes has a similar arrangement of reflectors. For example, for the sub-aperture telescope 90, light from the same remote object strikes the reflective surface of the primary reflector 100 and is directed to the reflective surface of the secondary reflector 108. The secondary reflector 108 directs light through a hole 122 in the primary reflector 100. The light passes through the hole 122, through a perforated fold flat 124, and strikes a collimating tertiary mirror 126. The tertiary mirror 126 directs the light back to the perforated fold flat 124 which directs the light on to the trombone mirror pair 128, which can be adjusted with adjusting means (not shown) to provide path-length adjustment, image rotation, and other functions as needed to combine the light from the different sub-apertures coherently.

The upper mirror of the mirror pair 128 then directs light to a nominally fixed fold flat 130, which then directs the light through the center of the array to a plurality of combiner elements which constitute the combiner module or section. As with the fold flat 120 of sub-aperture telescope 88, the fold flat 130 can be an oversized mirror which can facilitate pupil mapping adjustments.

For the next sub-aperture telescope 92, light from the remote object strikes the reflective surface of the primary reflector 102 and is directed to the reflective surface of the secondary reflector 110. The secondary reflector 110 directs light through a hole 132 in the primary reflector 102. The light passes through the hole 132, through a perforated fold flat 139, and strikes a collimating tertiary mirror 146. The tertiary mirror 146 directs the light back to the perforated fold flat 139 which directs the light on to the trombone mirror pair 154, which can be adjusted with adjusting means (not shown) to provide path-length adjustment, image rotation, and other functions as needed to combine the light from the different sub-apertures coherently.

The upper mirror of the mirror pair 154 then directs light to a nominally fixed fold flat 162, which then directs the light through the center of the array to a plurality of combiner elements which constitute the combiner module or section. As with the other sub-aperture telescopes, the fold flat 162 can be an oversized mirror which can facilitate pupil mapping adjustments.

Continuing with the next adjacent sub-aperture telescope 82, light from the remote object strikes the reflective surface of the primary reflector 93 and is directed to the reflective surface of the secondary reflector (not visible in the view of FIG. 4). The secondary reflector directs light through a hole 132 in the primary reflector 102. The light passes through the hole 134, through a perforated fold flat 140, and strikes a collimating tertiary mirror 148. The tertiary mirror 148 directs the light back to the perforated fold flat 140 which directs the light on to the trombone mirror pair 156, which can be adjusted with adjusting means (not shown) to provide path-length adjustment, image rotation, and other functions as needed to combine the light from the different sub-apertures coherently.

The upper mirror of the mirror pair 156 then directs light to a nominally fixed fold flat 164, which then directs the light through the center of the array to a plurality of combiner elements which constitute the combiner module or section. As with the other sub-aperture telescopes, the fold flat 164 can be an oversized mirror which can facilitate pupil mapping adjustments.

For the next adjacent sub-aperture telescope 84, light from the remote object strikes the reflective surface of the primary reflector 94 and is directed to the reflective surface of the secondary reflector (not visible in the view of FIG. 4). The secondary reflector directs light through a hole 136 in the primary reflector 94. The light passes through the hole 136, through a perforated fold flat 142, and strikes a collimating tertiary mirror 150. The tertiary mirror 150 directs the light back to the perforated fold flat 142 which directs the light on to the trombone mirror pair 158, which can be adjusted with adjusting means (not shown) to provide path-length adjustment, image rotation, and other functions as needed to combine the light from the different sub-apertures coherently.

The upper mirror of the mirror pair 158 then directs light to a nominally fixed fold flat 166, which then directs the light through the center of the array to a plurality of combiner elements which constitute the combiner module or section. As with the other sub-aperture telescopes, the fold flat 166 can be an oversized mirror which can facilitate pupil mapping adjustments.

For the last, adjacent sub-aperture telescope 86, light from the remote object strikes the reflective surface of the primary reflector 96 and is directed to the reflective surface of the secondary reflector 104. The secondary reflector 104 directs light through a hole 138 in the primary reflector 96. The light passes through the hole 138, through a perforated fold flat 144, and strikes a collimating tertiary mirror 152. The tertiary mirror 152 directs the light back to the perforated fold flat 144 which directs the light on to the trombone mirror pair 166, which can be adjusted with adjusting means (not shown) to provide path-length adjustment, image rotation, and other functions as needed to combine the light from the different sub-apertures coherently.

The upper mirror of the mirror pair 166 then directs light to a nominally fixed fold flat 168 which then directs the light through the center of the array to a plurality of combiner elements which constitute the combiner module or section. As with the other sub-aperture telescopes, the fold flat 168 can be an oversized mirror which can facilitate pupil mapping adjustments.

Preferably, each of the other sub-aperture telescopes includes similar structure and relay elements. All of these elements collectively provide the relay functions necessary to send the light collected by the individual sub-aperture telescopes to the combiner elements, which are located between the primary and secondary reflectors, and in particular, at the exit pupil of the combiner telescope. Collectively these elements constitute the relay module or section of the telescope array, which sends the light of all sub-aperture telescopes to the combiner. After combining, which will be described in more detail below, the light is focused at an image plane 170.

Figure 5:
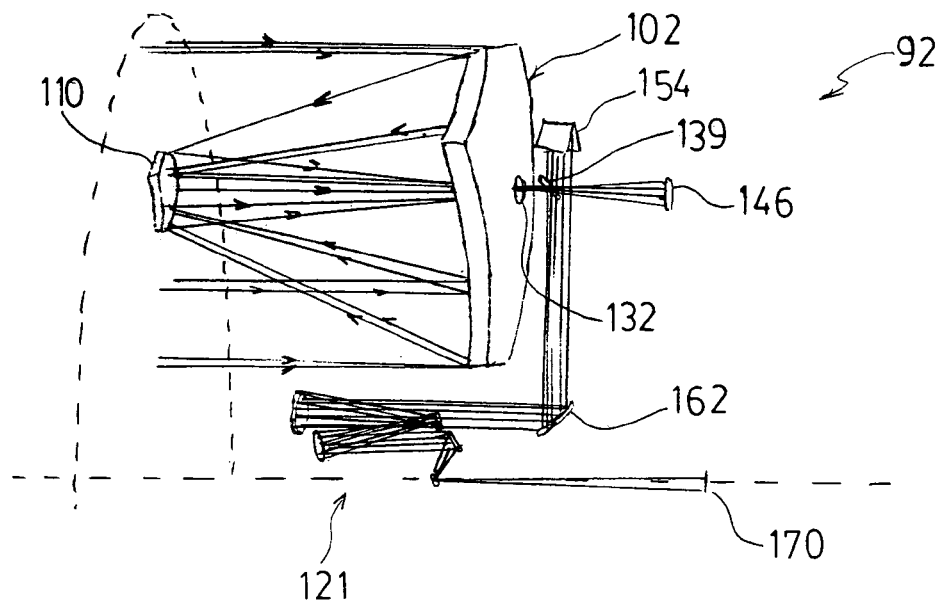
FIG. 5 is an enlarged perspective view showing details of the combiner and relay optics of the embodiment of FIG. 4.

A more detailed view of the relay optics for each sub-aperture telescope can be seen with reference to FIG. 5, showing the primary reflector 102 and secondary reflector 110 of the sub-aperture telescope 92. After passing through the hole 132, the light passes through the perforated fold flat 139 and strikes the tertiary reflector 146, where it is reflected back to the perforated fold flat 139 which reflects the light to the trombone mirror pair 154. The trombone mirror pair 154 reflects the light to the fold flat 162. After combining at the combiner section 121, which is only partially shown in FIG. 5, the combined light is passed to the image plane 170 which is located on the axis of the optical system.

Figure 6:
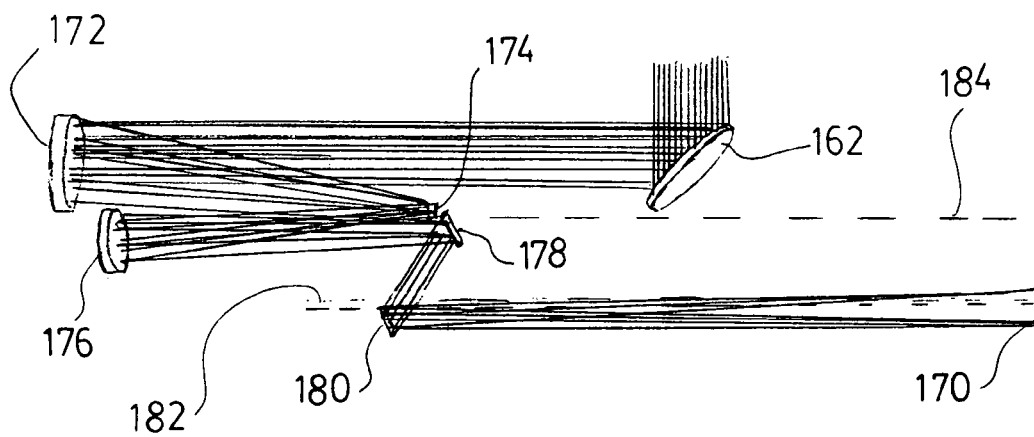
FIG. 6 is a further enlargement of the perspective view of FIG. 4, showing details of a portion of the combiner optics.

FIG. 6 is a further enlargement of FIG. 5, showing the light path from the fold flat 162 to the image plane 170. Light striking the fold flat 162 is reflected to a series of reflectors including the combiner primary reflector 172, the combiner secondary reflector 174, the combiner tertiary reflector 176, fold mirror 178, and exit pupil mirror 180. The system centerline, or optical axis, is designated by the reference numeral 182, which is displaced from the combiner centerline 184. The combiner elements are displaced in a radial direction for beam clearance, and the beams from each sub-aperture telescope are combined in the exit pupil of the telescope system (at the plane of mirror 180).

Figure 7:
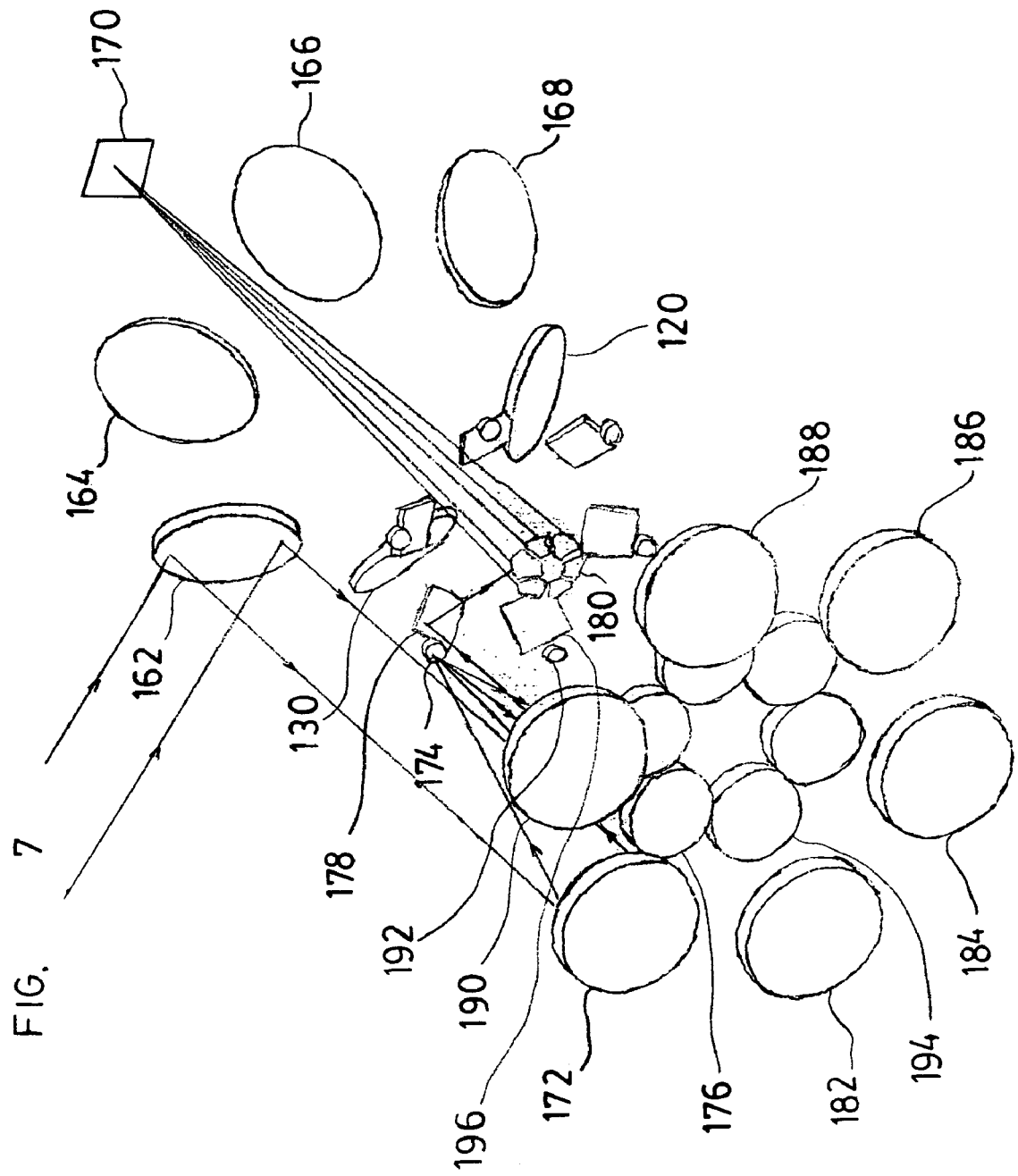
FIG. 7 is an enlarged perspective view of the total combiner optics, with the combining function occurring at the exit pupil.

FIG. 7 shows the total combiner section receiving light from the relay fold flat mirrors 120, 130, 162, 164, 166, and 168. As can be seen in FIG. 7, light from the fold flat mirror 162 is reflected to the mirror 172, which reflects the light to a smaller mirror 174, which then sends the light to another mirror 176. Light reflecting off mirror 176 is reflected off fold mirror 178 and is directed to a corresponding one of a plurality of exit pupil mirrors 180, arranged in an array that is a scaled replica of the array of primary reflectors 82, 84, 86, 88, 90, and 92. In the illustrated embodiment there are six exit pupil mirrors, each having a shape corresponding to that of the primary reflectors. The reflecting surfaces of the exit pupil mirrors reflect the light of the plurality of sub-aperture telescopes to the image plane 170.

A similar arrangement of mirrors is provided to combine all of the incoming light of the fold mirrors 164, 166, 168, and 120, so that all of the light from the sub-aperture telescopes is combined at the exit pupil.

The above-described phased telescope array concept which consists of a number of individual telescopes arranged so as to have a fill factor similar to that of a single large telescope. Using this approach, fill factors of 80% or more can be achieved. Unlike previous sparse aperture telescope designs, the combining of the light beams from the collectors is performed at an exit pupil. This step is critical to achieving high fill factors. The illustrated embodiment provides details of an eight meter diameter array, although larger and smaller designs can be employed so long as the basic arrangement of the combiner is used, with the combination of light occurring at the exit pupil.

By providing a plurality of sub-aperture telescopes, which can be mounted on mechanical systems that enable stowage in relatively smaller spaces and deployment in larger dispositions, the present invention can achieve optical performance comparable to a single large telescope but with much more compact dimensions.

Previous sparse aperture designs have had considerable spacing between the telescope apertures to provide light beam clearance at the combiner plane to prevent vignetting and optical element interference. In effect, the prior sparse designs were necessarily sparse to achieve any level of functionality.

The present invention performs the light beam combining function at an internal exit pupil, i.e., an image of the entrance pupil which is usually the plane of the collector primary mirrors. This permits the collector apertures to be closely spaced (leading to a high fill factor).

Although the invention has been described with reference to particular embodiments, it will be understood to those skilled in the art that the invention is capable of a variety of alternative embodiments within the sprit of the appended claims.

The invention claimed is:

1. A high fill factor telescope, comprising:
   a collector section, the collector section comprising a plurality of sub-aperture telescopes disposed to collect light from an image;
   a combiner section, the combiner section comprising a plurality of mirrors; and
   a relay section for relaying the light from the collector section to the combiner section;
   wherein the combiner section further comprises an array of mirrors, each mirror in the array being located substantially at a real exit pupil of each of the sub-aperture collector telescopes, and each mirror in the array being disposed to combine light from the plurality of sub-aperture telescopes and to focus the combined light at an image plane.

2. A high fill factor telescope array according to claim 1, wherein each sub-aperture telescope comprises a primary element, a secondary element, and a tertiary element.

3. A high fill factor telescope array according to claim 2, wherein the primary, secondary, and tertiary elements of each sub-aperture telescope are refractive elements.

4. A high fill factor telescope array according to claim 2, wherein the primary, secondary, and tertiary elements of each sub-aperture telescope are reflective elements.

5. A high fill factor telescope array according to claim 2, wherein the primary elements of the sub-aperture telescopes collectively define a primary collector plane.

6. A high fill factor telescope array according to claim 2, wherein the primary elements of the sub-aperture telescopes collectively define a generally annular high fill primary reflector.

7. A high fill factor telescope array according to claim 1, wherein each sub-aperture telescope comprises a primary reflector, a secondary reflector, and a tertiary reflector, and wherein the combiner section comprises a plurality of optical elements, which are displaced in a radial direction, thereby permitting the combiner optical elements to have a size sufficient to accommodate a finite field of view without physically interfering with optical elements of adjacent sub-aperture telescopes.

8. A high fill factor telescope array according to claim 1, wherein the plurality of sub-aperture telescopes comprises six sub-aperture telescopes, each comprises a primary reflector, a secondary reflector, and a tertiary reflector, wherein the primary reflectors are arranged to define a primary reflector plane, and the secondary reflectors are arranged to define a secondary reflector plane.

9. A high fill factor telescope array according to claim 1, wherein the combiner section comprises a plurality of reflector elements defining a plurality of combiner sub-sections, each combiner sub-section being positioned to receive light from one of the sub-aperture telescopes at positions spaced radially from and around an axis of the telescope array, and each combiner sub-section comprising a plurality of exit pupil mirrors disposed radially around the axis of, and at the exit pupil of, the telescope array.

10. A high fill factor telescope array according to claim 9, wherein the plurality of exit pupil mirrors reflect focused light to the image plane.

11. A high fill factor telescope array according to claim 1, wherein the fill factor is at least about 50%.

12. A high fill factor telescope array according to claim 1, wherein the fill factor is at least about 80%.

13. A high fill factor telescope array according to claim 1, wherein the relay section comprises a plurality of flat mirrors for directing light from the plurality of sub-aperture telescopes radially outwardly and radially inwardly relative to an axis of the telescope array.

14. A high fill factor telescope array according to claim 13, wherein the relay section comprises a plurality of relay sub-sections, each comprising a first fold flat mirror receiving light from a corresponding one of the sub-aperture telescopes, a trombone mirror pair receiving light reflected from the first fold flat mirror, and a second fold flat mirror radially spaced outwardly in relationship to an axis of the combiner and inwardly relative to the first fold flat mirror, and being positioned to receive light reflected from the trombone mirror pair.

15. A high fill factor telescope array according to claim 14, wherein the combiner section comprises a plurality of combiner sub-sections, each comprising an exit pupil mirror located at the exit pupil of the telescope array, and a plurality of non-flat mirrors in an optical path between a corresponding second fold flat mirror of the corresponding relay sub-section and the exit pupil mirror.

16. A high fill factor telescope array according to claim 15, wherein the exit pupil mirrors of the combiner sub-sections form an array of mirrors centered on an optical axis of the telescope array.

17. A high fill factor telescope array according to claim 14, wherein the first fold flat mirror is adjustable to provide LOS control, and the trombone mirror pair is adjustable to provide pathlength adjustment and image rotation.

18. A high fill factor telescope array according to claim 1, wherein the plurality of sub-aperture telescopes are deployable in space and mounted on structure which facilitates stowing the telescope array in a cargo bay of a launch vehicle, and deploying the telescope array in space whereby a plurality of primary collector elements of the plurality of sub-aperture telescopes define a generally circular primary collector having a collector plane.

19. A space-based multi-aperture telescope comprising:
a plurality of sub-aperture telescopes which are deployable in space so as to form a multi-operative telescope array having a diameter of at least about eight meters, and wherein the array of sub-aperture telescopes have a fill factor of at least about 50% and wherein the space-based multi-aperture telescope further comprises a combiner section having an array of mirrors, each mirror in the array being located substantially at the real exit pupil of each of the sub-aperture collector telescopes so as to produce a substantially unvignetted field of view.

20. A space-based multi-aperture telescope according to claim 19, wherein the fill factor is at least about 80%.

21. An optical system for use in space, comprising:
plural collector means for collecting light from object space; and
relay means for relaying the collected light to a combiner means, the combiner means comprising an optical array of mirrors, each mirror in the array being located substantially at a real exit pupil of one of the plural collector means, and
wherein the optical array has a fill factor of at least about 50%.

22. An optical system according to claim 21, wherein the plural collector means comprises a collector section having a plurality of sub-aperture telescopes, each including a primary collector, a secondary collector, and a tertiary collector.

23. An optical system according to claim 22, wherein the combiner means comprises a plurality of combiner sub-sections disposed to combine light from the plurality of sub-aperture telescopes at about an exit pupil of the system and to focus the combined light at an image plane.

24. An optical system according to claim 23, wherein the relay means comprises a plurality of relay sub-sections, each being positioned in operable relation to corresponding ones of a plurality of combiner sub-sections.

25. An optical system according to claim 22, wherein the primary collectors of the plurality of sub-aperture telescopes are deployable from a relatively small dimension to a relatively larger dimension after launching in space.

26. An optical system according to claim 25, wherein the primary collectors, after deployment, form a substantially circularly shaped primary collector defining a primary collector plane.

27. An optical system according to claim 26, wherein each sub-aperture telescope comprises a primary reflector, a secondary reflector, and a tertiary reflector, and the combiner means comprises a plurality of optical elements, which are displaced in a radial direction, thereby permitting the combiner optical elements to have a size sufficient to accommodate a finite field of view without physically interfering with optical elements of adjacent sub-aperture telescopes.

28. An optical system according to claim 21, wherein the optical array has a fill factor of at least about 80%.

29. A method of achieving a fill factor of at least about 50% in a multi-aperture telescope system, comprising:
collecting light from a plurality of sub-aperture telescopes; and
relaying the collected light with relay optical components to a combining section which combines the relayed light with an array; and
an array of mirrors, wherein one mirror in the array is located substantially at a real exit pupil of each of the sub-aperture collector telescopes.

30. A method according to claim 29, wherein the combining comprises positioning a plurality of exit pupil mirrors around an optical axis of the telescope system, and in an optical path with the sub-aperture telescopes and the relay optical components.

31. The telescope according to the claim 29, wherein the combiner section is disposed between the primary collector elements and the secondary collector elements of the sub-aperture telescopes.

32. The telescope according to claim 29, further comprising a relay section configured to relay radiation collected by the sub-aperture telescopes from the sub-aperture telescopes to the collector section.

* * * * *

UNITED STATES PATENT AND TRADEMARK OFFICE
CERTIFICATE OF CORRECTION

| | | |
|---|---|---|
| PATENT NO. | : 7,009,764 B1 | Page 1 of 1 |
| APPLICATION NO. | : 10/206087 | |
| DATED | : March 7, 2006 | |
| INVENTOR(S) | : Robert Sigler et al. | |

It is certified that error appears in the above-identified patent and that said Letters Patent is hereby corrected as shown below:

TITLE PAGE:

Under (75) Inventors, "Alan Lee Ducan" should read --Alan Lee Duncan--.

Signed and Sealed this

Thirteenth Day of February, 2007

JON W. DUDAS
*Director of the United States Patent and Trademark Office*